May 26, 1964     M. T. KRUEGER     3,134,186

FISHING DEVICE AND MOUNTINGS THEREFOR

Filed July 3, 1961     2 Sheets-Sheet 1

INVENTOR.
MARK T. KRUEGER
BY Joseph G. Werner
ATTORNEY

May 26, 1964 M. T. KRUEGER 3,134,186
FISHING DEVICE AND MOUNTINGS THEREFOR
Filed July 3, 1961 2 Sheets-Sheet 2
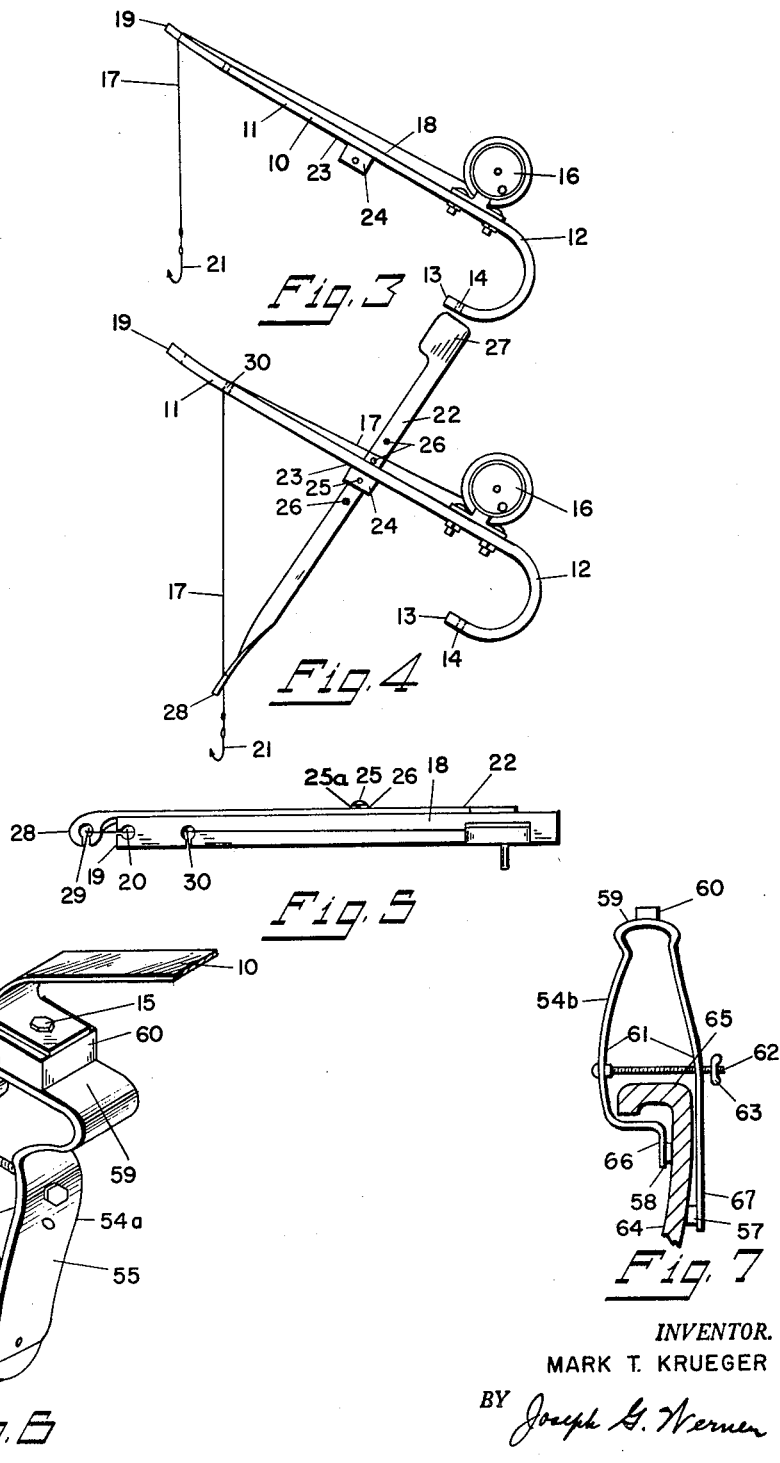
INVENTOR.
MARK T. KRUEGER
BY Joseph G. Werner
ATTORNEY

United States Patent Office 3,134,186
Patented May 26, 1964

3,134,186
FISHING DEVICE AND MOUNTINGS THEREFOR
Mark T. Krueger, 1937 Motel, Madison, Wis.
Filed July 3, 1961, Ser. No. 121,757
4 Claims. (Cl. 43—17)

This invention relates to new and useful improvements in fishing devices and mountings therefor.

It is an object of my invention to provide a fishing device which will immediately warn the fisherman when a fish bites. It is a further object of my invention to provide a fishing device which will give the bait motion when it is struck by a fish. It is an additional object of my invention to provide a fishing device which is equally well suited for fishing through the ice and fishing from a boat.

Another object of my invention is to provide a protective mounting for an ice fishing device which will protect the ice fisherman from the wind. It is a still further object of my invention to provide a protective mounting for an ice fishing device which will support the ice fisherman.

It is an additional object of my invention to provide a boat mount for a fishing device that can be quickly and easily attached and detached from the side of a boat.

Other objects and advantages of the invention will be apparent from the following detailed explanation taken in conjunction with the accompanying drawings wherein a preferred embodiment of the principles of the invention has been selected for exemplification.

In the drawings:

FIG. 3 is a side view of the fishing device of my invention.

FIG. 4 is a side view of a modification of my fishing device which includes a flag arm.

FIG. 5 is a top view of the modification of my invention shown in FIG. 4.

FIG. 6 is a perspective view of a boat mount of my invention for my ice fishing device.

FIG. 7 is a side view of a modification of my boat mount attached to the side of a boat shown in section view.

Figure 1:
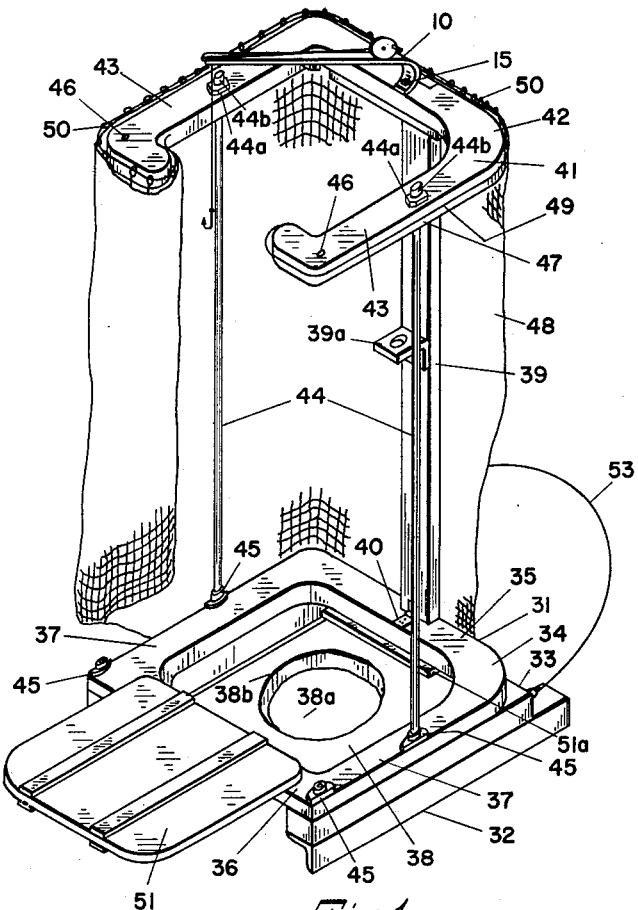
FIG. 1 is a perspective view of the fishing device and protective mounting of my invention.

Referring more particularly to the drawings in which like numerals refer to like parts, the fishing device 10 shown in FIGS. 1 and 3 has as its principal element a resilient bar member 11. The bar member 11 has an arcuate portion 12 near its base end 13. The arcuate portion 12 may be semi-circular or somewhat less than semi-circular, as shown, depending on the preference of the fisherman. The base end 13 may have a mounting hole 14 through which a mounting bolt 15 may extend into suitable mounting means to support the fishing device 10. It is obvious that the fishing device may be secured to suitable mounting means in many different ways, and my invention is not limited to the one particular way described. A fishing reel 16 may be attached to the bar member 11, preferably on the bar member upper face 18 near the arcuate portion 12. The bar member 11 has a tip 19 with a tip guide 20 which may have a grooved shape as shown in FIG. 5. A fishing line 17 is attached to the reel 16 and extends from the reel along the bar member 11 through the tip guide 20, and downward to support a fishhook 21.

To use my fishing device, the fisherman merely baits the hook 21 and pulls a sufficient length of line 17 off the reel 16 to allow the baited hook 21 to reach the desired depth in the water. When a fish bites the bait, the shock is transferred through the line 17 to the resilient bar member 11. The resiliency of the bar member 11, together with the spring effect of the arcuate portion 12 gives the bar member 11 extreme sensitivity, and it immediately moves to warn the fisherman when a fish strikes the bait. The fisherman may then immediately pull on the fish line and bring in the hooked fish.

The modified form of my fishing device 10 shown in FIG. 4 is preferable when the fisherman cannot watch the fishing device 10 closely. The modified device has a flag arm 22 which is pivotally attached to the bar member 11. Attachment may be provided by a pivot block 24, attached to the lower face 23 of the bar member 11, which engages a pivot bolt 25 passing through a pivot hole 26 in the flag arm 22. The flag arm has a flag end 27 and a tip end 28. A flag arm guide 29, which may be substantially similar to the bar member tip guide 20, is located near the flag arm tip end 28. When the flag arm 27 is to be used it is preferable than an intermediate guide 30 be provided in the bar member 11 between the reel 16 and the tip 19. The fishing line 17 passes from the reel 16 along the bar member 11 and downward through the intermediate guide 30. It then passes along the bar member lower face 23 and over the flag arm tip end 28 to go downward through the flag arm guide 29 as shown in FIG. 5. In operation, when a fish strikes the bait, both the bar member 11 and the flag arm 22 are set in motion. As soon as the fish starts to pull on the hook 21 and the line 17, the line tends to straighten out between the fish and the bar member intermediate guide 30, with the result that the flag arm pivots to the position shown in FIG. 4, wherein the flag arm guide 29 is generally in alignment with the fish and the intermediate guide 30, and the flag end 27 extends upward to warn the fisherman. Changing the position of the intermediate guide 30 along the bar member 11 will change the height to which the flag end 27 raises, and also provide such adjustment as may be best suited for the individual fisherman. The pivot hole 26 should be located so that the flag end 27 will be slightly heavier than the tip end 28 and will normally be in the lowered position shown in FIG. 5. A lockwasher 25a may also be used with the pivot pin 25 to permit the fisherman to adjust the force needed to raise the flag end 27. The flag arm 22 may be provided with several alternate pivot holes 26 as shown, to allow adjustment to suit the fisherman. The flag end 27 is prevented from dropping further by the fishing line 17 passing beneath the bar member 11 near the tip end.

Figure 2:
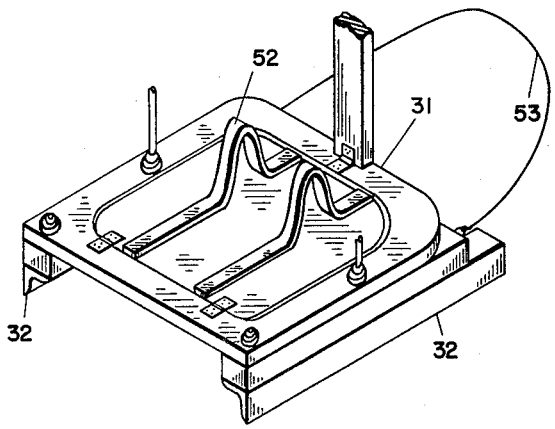
FIG. 2 is a partial perspective view of my protective mounting with the platform in the closed position.

FIGS. 1 and 2 illustrate my protective mounting 31 for ice fishing with my fishing device 10. My protective mounting 31 has a pair of runners 32 which can be drawn over ice or snow and which support a base frame 34. The base frame 34 may be separated from the runners 32 by a pair of intermediate support blocks 33, which provide more clearance between the base frame 34 and the ice and make my protective mounting 31 easier to move when the ice has a snow covering. The base frame 34 preferably has a back section 35, a front section 36 and a pair of side sections 37, with a center opening 38 as shown. The center opening 38 is preferably large enough to allow the passage of any fish which the fisherman might expect to catch through hole 38a in ice 38b. The drawings shows the runners 32 and intermediate support blocks 33 attached to the side sections 37, which is preferred. A center yoke support 39 extends upward from the base frame 34 to support a yoke 41, which may have a back section 42 and a pair of side sections 43 vertically disposed from the base frame back and side sections 35, 37 respectively. The center yoke support 39 is preferably attached to the base frame back section 35 and yoke back section 42 in pivotal relation, which may be accomplished by yoke support hinges 40, to allow the mounting to be folded to form a compact unit for storage. FIG. 1 shows the hinge 40 connecting the center yoke support 39 to the base frame 34. The connection of the center yoke support 39 and the yoke 40 is preferably similar and is seen from above the yoke in FIG. 1. A pair of yoke side supports 44 which may preferably be ½ inch pipe sections may be detachably extended between the vertically disposed side sections 37 and 43 of the base frame 34 and yoke 41 in supporting relation. It is preferable that the yoke side supports 44 have alternate positions. FIG. 1 shows each base frame side section 37 having two side support bases 45, which may be pipe flanges, one of which may be located approximately midway along the side section 37 and the other near the intersection of the side section 37 and front section 36. The yoke 41 has side support holes 46 vertically disposed from the side support bases 45 to receive the side supports 44. The side supports 44 are preferably threadedly attached to the support bases 44 and secured to the yoke 41 by support nuts 44a which are threadedly connected to the side supports 44 both above and below the yoke 41. The support nuts 44a are tightened against the yoke 41 to provide a rigid mounting 31 which will not be harmed by the wind or rough handling. A pipe cap 44b may be provided also for increased rigidity. The fisherman may place the yoke side supports 44 at whichever position he desires, it being preferable to have the side supports located midway along the side sections 37, 43, while fishing and near the front section 36 when moving across the ice. The fisherman may also transport the mounting across the ice in the collapsed position to eliminate wind resistance. My fishing device 10 is preferably mounted on the yoke 41, so that the tip 19 extends over the frame center opening 38. FIG. 1 shows the fishing device 10 mounted on the yoke back section 42 by means of the mounting bolt 15. A support member 39a may also be provided on the center yoke support 39, to provide an alternative mounting for the fishing device 10.

My protective mounting 31 is provided with a wind resistant curtain 48 which may be attached to the outer edge 47 of the yoke 41 in slidable relation to protect the fisherman. The curtain 48 may extend around all three sides of the yoke 41, or it may be pulled back to enclose only a portion of the yoke. FIG. 1 illustrates one possible means of attaching the curtain 48 to the yoke 41, which incorporates a guide rail 49 extending the length of the yoke outer edge 47 and guide rings 50 which slide along the guide rail 49 and carry the curtain 48. The curtain is preferably of such length as to extend to the base frame 34, and it may be attached to the base frame 34 in the same manner as it is attached to the yoke. My protective mounting 31 is preferably from 30 to 36 inches high, but may be whatever height is preferred by the fisherman. The fishing device 10 may also be protected from the wind by mounting it on the alternate support member 39a on the center yoke support 39.

A platform 51 may be pivotally attached to the front section 36 of the base frame 34, as shown in FIGS. 1 and 2. It is preferable that the platform 51 be adapted to fit within the base frame center opening 38, as shown in FIG. 2 for compactness. In addition, the location of the platform 51 within the center opening 38 prevents snow from passing up through the center opening 38 and hindering movement of the mounting 31 while it is being drawn across the ice. When so located, the platform 51 rests on the platform sill 51a, shown in FIG. 1. FIG. 1 illustrates the platform pivoted to the position in which it will be used. The platform may be used as a place to sit, kneel, or stand by the ice fisherman. The support legs 52, shown best in FIG. 2, rest on the ice and help support the platform 51.

In use, the ice fisherman sets up my protective mounting 31 with the base frame center opening 38 over the ice fishing hole 38a with the yoke back section 42 in the direction of the wind. The curtain 48 is drawn around the yoke 41, the platform 51 is pivoted to the position in which it will be used, and the hook 21 is baited and dropped through the hole in the ice to the desired depth. The fisherman can then sit or kneel on the platform 51, protected from the wind by the wind resistant curtain 48 and wait for a fish to bite. If he wishes to move to a different spot on the ice, he simply reels in the line and pulls the ice fishing mounting 31 across the ice on the runners 32 to a new fishing hole. FIG. 1 shows a tow rope 53 attached to my protective mounting to facilitate its movement over the ice. When the fisherman wishes to transport or store my protective mounting, he simply removes the side supports 44, folds the center yoke support 39 down across the base frame front section 36 and folds the yoke 41 against the center yoke support 39 to form a compact package which will occupy little space.

FIGS. 6 and 7 illustrate boat mounts 54a and 54b for my fishing device 10. FIG. 6 illustrates a boat mount 54a for a flat bottom boat with straight sides. FIG. 7 illustrates a modified mount 54b for a round bottom, curved side boat. My boat mount 54a for a flat sided boat has an outer leg 55 and an inner leg 56 with opposed outer and inner jaws 57, 58. The outer and inner legs 55, 56 are connected by a shoulder 59 which may support a mounting block 60. It is preferable that the outer and inner legs 55, 56 and shoulder 60 are formed from a single piece of material, as illustrated, but my invention embraces any combination of pieces to form the legs and shoulder. The outer and inner legs 55 and 56 have bowed sections 61 near their mid-point, which provide an adequate space to encompass any reinforcement strips which may extend along the top of the boat side. The jaws 57, 58 are forced together by means of a tightening nut 63 which is threadedly connected to a tightening bolt 62 passing through the outer and inner legs 55, 56 near the leg bowed sections 61. The outer and inner legs 55, 56 preferably extend inwardly toward each other near their upper ends between the bowed sections 61 and the shoulder 59, as shown, for increased strength and rigidity. The jaws 57, 58 of my boat mount are preferably made of a resilient, non-skid material, such as rubber, to provide a non-skid grip which will not harm the surface of the boat.

In use, my boat mount 54a is attached to the straight side of a boat by extending the jaws 57, 58 of the mount around the boat side and turning the tightening nut 63 to draw the jaws together. My fishing device 10 is then mounted on the mounting block 60 by means of the mounting bolt 15 and is ready for use. It may often be desirable to use the flag arm 22 with my fishing device 10 when it is mounted on a boat.

FIG. 7 shows a modified boat mount 54b attached to a boat having a curved side 63 and a partial deck 65. The inner leg 66 of my modified boat mount 54b has an L-shaped section which extends away from the outer leg 67 to accommodate the partial deck 65 of the boat. The outer leg 67 of my modified boat mount may be longer than the inner leg 66 for greater stability. The modified boat mount 54b is preferably mounted on the boat so that the tightening bolt 62 clears the top of the boat deck 65 to prevent any injury to the boat deck 65, but it may be mounted so that the tightening bolt bears on a pad attached to the boat deck 65. The modified boat mount 54b may be enlarged and have alternative positions for the tightening bolt 62 to accommodate boats with larger partial decks 65 or which carry air tanks beneath the partial deck.

It is understood that my invention is not confined to the particular construction and arrangement of parts herein illustrated and described, but embraces all such modified forms thereof as come within the scope of the following claims.

I claim:

1. A mounting for a fishing device comprising, a base frame having a center opening therein, runners mounted below said base frame, a platform pivotally mounted to one edge of said base frame and movable from a position substantially covering said center opening to a position extending outwardly from said base frame, a support member pivotally mounted on said base frame at the edge opposite to said one edge and said support member being of materially less width than said edge of said frame, said support member being movable from a position resting upon said base frame to a position extending substantially vertically above said base frame, a yoke member secured to the outer end of said support member so that said yoke member is substantially parallel to and above said base frame when said support member is in said position vertical to said base frame, and rod means extending between said base frame and said yoke member said yoke being adapted to receive curtain means extending from said yoke to said base frame.

2. The apparatus of claim 1 further comprising a resilient bar member having a tip end and a substantially semicircular arcuate portion terminating in a base end, means for detachably mounting said base end to said yoke member, means for mounting a fishing reel including a line on said resilient bar member between said tip end and said arcuate portion, and guide means between said reel mounting means and said tip end for receiving said line.

3. The apparatus of claim 2 further comprising a trip arm having a tip end and a flag end pivotally mounted on said bar member between said reel mounting means and said intermediate guide means and, guide means in said tip end of said trip arm for passage of said line therethrough.

4. An ice fishing device comprising in combination, a protective mounting having a plurality of runners adapted to be drawn over ice, a base frame with a center opening supported by said runners in fixed relation, a yoke vertically disposed from said base frame, support means extending from said base frame to said yoke in supporting relation, a wind resistant curtain extending from said yoke to said base and attached to both members in slidable relation, a resilient bar member having a base end detachably connected to said yoke, said bar member having a substantially semicircular arcuate portion near said base end and having a tip vertically disposed from said base frame center opening, a fishing line attached to said bar member, and guide means on said tip for said fishing line.

References Cited in the file of this patent
UNITED STATES PATENTS

| | | |
|---|---|---|
| 2,136,864 | Paquette | Nov. 15, 1938 |
| 2,473,778 | Benes | June 21, 1949 |
| 2,496,090 | Grohs | Jan. 31, 1950 |
| 2,513,475 | Grevich | July 4, 1950 |
| 2,530,864 | Easterday | Nov. 21, 1950 |
| 2,548,328 | Thayer | Apr. 10, 1951 |
| 2,548,351 | Coombs | Apr. 10, 1951 |
| 2,559,934 | Briney | July 10, 1951 |
| 2,663,962 | King | Dec. 29, 1953 |
| 2,664,661 | Kohn | Jan. 5, 1954 |
| 3,012,352 | Logsdon | Dec. 12, 1961 |
| 3,030,122 | Madera | Apr. 17, 1962 |
| 3,034,753 | Johnston et al. | May 15, 1962 |

OTHER REFERENCES

Popular Science, "Buddy Reel Rig," page 50, June 1949.